US012027777B2

(12) United States Patent
Noguchi

(10) Patent No.: US 12,027,777 B2
(45) Date of Patent: Jul. 2, 2024

(54) ANTENNA DEVICE

(71) Applicant: PANASONIC INTELLECTUAL PROPERTY MANAGEMENT CO., LTD., Osaka (JP)

(72) Inventor: Wataru Noguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 450 days.

(21) Appl. No.: 17/299,655

(22) PCT Filed: Aug. 4, 2020

(86) PCT No.: PCT/JP2020/029741
§ 371 (c)(1),
(2) Date: Jun. 3, 2021

(87) PCT Pub. No.: WO2021/171650
PCT Pub. Date: Sep. 2, 2021

(65) Prior Publication Data

US 2022/0320757 A1 Oct. 6, 2022

(30) Foreign Application Priority Data

Feb. 27, 2020 (JP) ................................ 2020-031911

(51) Int. Cl.
*H01Q 21/30* (2006.01)
*H01Q 1/22* (2006.01)
(Continued)

(52) U.S. Cl.
CPC ........... *H01Q 21/30* (2013.01); *H01Q 1/2291* (2013.01); *H01Q 1/241* (2013.01); *H01Q 1/36* (2013.01); *H01Q 1/48* (2013.01); *H01Q 1/521* (2013.01); *H01Q 1/523* (2013.01); *H01Q 5/42* (2015.01); *H01Q 9/42* (2013.01); *H01Q 13/08* (2013.01)

(58) Field of Classification Search
None
See application file for complete search history.

(56) References Cited

U.S. PATENT DOCUMENTS 9,147,936 B1 * 9/2015 Apostolos .............. H01Q 5/328
10,916,851 B2 * 2/2021 Wei ...................... H01Q 9/0407
(Continued)

FOREIGN PATENT DOCUMENTS

CN 102170043 A * 8/2011 ............ H01Q 1/243
JP 2000-059130 A 2/2000

OTHER PUBLICATIONS

International Search Report and Written Opinion issued in International Patent Application No. PCT/JP2020/029741, dated Oct. 27, 2020.
(Continued)

*Primary Examiner* — Dameon E Levi
*Assistant Examiner* — Anh N Ho
(74) *Attorney, Agent, or Firm* — Rimon P.C.

(57) ABSTRACT

An antenna device includes: a first ground member; one or more first antennas which are connected to the first ground member and resonate in a first frequency band; a second ground member; one or more second antennas which are connected to the second ground member and resonate in a second frequency band; one or more first filters which connect the first and second ground members and attenuate a signal in the first frequency band; and one or more second filters which connect the first and second ground members at a position different from a position where the one or more first filters connect the first and second ground members and attenuate the signal in the first frequency band less than the one or more first filters.

7 Claims, 9 Drawing Sheets

(51) Int. Cl.

| | |
|---|---|
| ***H01Q 1/24*** | (2006.01) |
| ***H01Q 1/36*** | (2006.01) |
| ***H01Q 1/48*** | (2006.01) |
| ***H01Q 1/52*** | (2006.01) |
| ***H01Q 5/42*** | (2015.01) |
| ***H01Q 9/42*** | (2006.01) |
| ***H01Q 13/08*** | (2006.01) |

(56) References Cited

U.S. PATENT DOCUMENTS

| | | | | |
|---|---|---|---|---|
| 2010/0248621 | A1* | 9/2010 | Takahashi | H01Q 1/243<br>455/39 |
| 2013/0009849 | A1* | 1/2013 | Ohguchi | H01Q 21/28<br>343/893 |
| 2019/0058255 | A1* | 2/2019 | Chou | H01Q 9/42 |
| 2019/0115654 | A1* | 4/2019 | Huang | H01Q 9/40 |
| 2021/0160630 | A1* | 5/2021 | Troelsen | H04R 25/554 |

OTHER PUBLICATIONS

Extended European Search Report dated Jun. 20, 2023 issued in the corresponding European Patent Application No. 20888737.2.

Di Wu et al: "Decoupling using diamond-shaped patterned ground resonator for small MIMO antennas", IET Microwaves, Antennas & Propagation, the Institution of Engineering and Technology, United Kingdom, vol. 11, No. 2, Jan. 1, 2017 (Jan. 1, 2017), pp. 177-183, XP006107337.

* cited by examiner

ANTENNA DEVICE

CROSS-REFERENCE OF RELATED APPLICATIONS

This application is the U.S. National Phase under 35 U.S.C. § 371 of International Patent Application No. PCT/JP2020/029741, filed on Aug. 4, 2020, which in turn claims the benefit of Japanese Application No. 2020-031911, filed on Feb. 27, 2020, the entire disclosures of which Applications are incorporated by reference herein.

TECHNICAL FIELD

The present disclosure relates to an antenna device.

BACKGROUND ART

In recent years, wireless communication has been progressing, and the use of an antenna based on a plurality of standards such as a wireless local area network (LAN) or Bluetooth (registered trademark) in one electronic device has started. A multiband antenna capable of transmitting and receiving signals in a plurality of frequency bands with one antenna has been suggested as an antenna for performing wireless communication in a plurality of frequency bands as described above (for example, Patent Literature (PTL) 1).

A dual band antenna described in PTL 1 includes a straight part and a helical coil-like part. This helical coil-like part functions as a chalk coil for signals in high frequency bands and functions as part of a downsized antenna for signals in low frequency bands. Consequently, PTL 1 attempts to realize a dual band antenna which is of a compact size and capable of varying an effective electric length in accordance with a frequency.

CITATION LIST

Patent Literature

[PTL 1] Japanese Unexamined Patent Application Publication No. 2000-59130

SUMMARY OF INVENTION

Technical Problem

The present disclosure provides an antenna device which has two kinds of antennas resonating in mutually different frequency bands and is capable of adjusting the directivity in each of the antennas.

Solution to Problem

An antenna device according to the present disclosure includes: a first ground member which is connected to a ground; one or more first antennas which are connected to the first ground member and resonate in a first frequency band; a second ground member which is arranged at a position adjacent to the first ground member with a gap in between and connected to a ground different from the ground to which the first ground member is connected; one or more second antennas which are connected to the second ground member and resonate in a second frequency band different from the first frequency band; one or more first filters which connect the first ground member and the second ground member and attenuate a signal in the first frequency band; and one or more second filters which connect the first ground member and the second ground member at a position different from a position where the one or more first filters connect the first ground member and the second ground member, and which attenuate the signal in the first frequency band less than the one or more first filters.

Advantageous Effects of Invention

The present disclosure can provide an antenna device which has two kinds of antennas resonating in mutually different frequency bands and is capable of adjusting the directivity in each of the antennas.

DESCRIPTION OF EMBODIMENTS

Hereinafter, the embodiments will be described in detail with reference to the drawings.

Note that the embodiments described below each illustrate a comprehensive or detailed example. Numerical values, shapes, materials, components, arrangement positions and connection modes of the components, steps, a sequence of the steps, etc., illustrated in the embodiments below each form one example and are not intended to limit the present disclosure.

Moreover, each of the drawings is a schematic diagram and does not necessarily provide precise illustration. The same components in the respective drawings are provided with the same signs.

Embodiment 1

An antenna device according to Embodiment 1 will be described.

[1-1. Configuration]

First, the configuration of the antenna device according to Embodiment 1 will be described with reference to FIG. 1.

Figure 1:
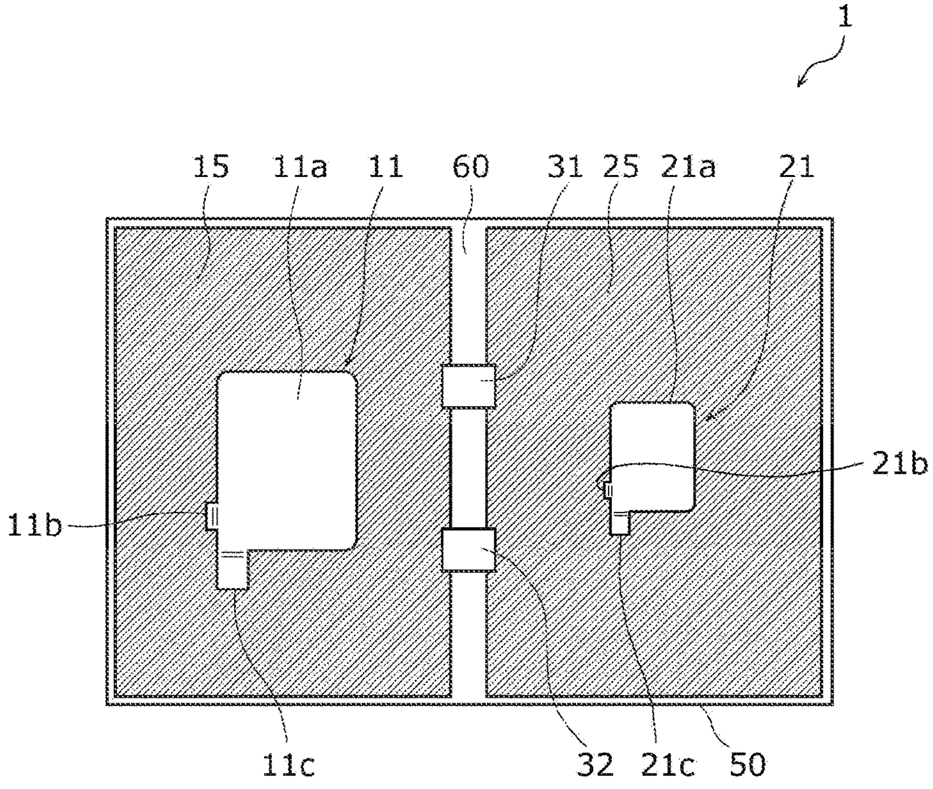
FIG. 1 is a schematic plan view illustrating a configuration of an antenna device according to Embodiment 1.

FIG. 1 is a schematic plan view illustrating the configuration of antenna device 1 according to the present embodiment. The plan view in FIG. 1 provides a plan view of substrate 50 of antenna device 1.

Antenna device 1 is an antenna which transmits and receives signals in a plurality of frequency bands. In the present embodiment, antenna device 1 transmits and receives the signal in the first frequency band and the signal in the second frequency band different from the first frequency band. The first frequency band and the second frequency band are not specifically limited, but the first frequency band is lower than the second frequency band in the present embodiment. More specifically, the first frequency band and the second frequency band are a 2.4 GHz band and a 5 GHz band, respectively. Consequently, antenna device 1 can be used as a dual band antenna in the 2.4 GHz and 5 GHz bands based on standards of a wireless LAN. As illustrated in FIG. 1, antenna device 1 includes first ground member 15, first antenna 11, second ground member 25, second antenna 21, first filter 31, and second filter 32. In the present embodiment, antenna device 1 further includes substrate 50.

First ground member 15 is a conductive member which is connected to a ground. The shape of first ground member 15 is not specifically limited. In the present embodiment, first ground member 15 has a membrane-like shape and is arranged in a predetermined region on substrate 50. For example, a copper film or the like which is arranged on substrate 50 and patterned can be used as first ground member 15.

Second ground member 25 is a conductive member which is arranged at a position adjacent to first ground member 15 with gap 60 in between and is connected to a ground different from the ground to which first ground member 15 is connected. The shape of second ground member 25 is not specifically limited. In the present embodiment, second ground member 25 is arranged in a region on substrate 50 adjacent to a region where first ground member 15 is arranged and has a membrane-like shape. For example, a copper film or the like which is arranged on substrate 50 and patterned can be used as second ground member 25. Gap 60 is a portion which electrically insulates first ground member 15 and second ground member 25 from each other. In the present embodiment, gap 60 is a space which has a width of approximately 1 mm. The width of gap 60 is not limited to approximately 1 mm. The width of gap 60 may be, for example, approximately greater than or equal to one five-hundredth and less than or equal to one fiftieth of a wavelength corresponding to the first frequency band or the second frequency band. Moreover, the width of gap 60 may be greater than or equal to one two-hundredth or less than or equal to one hundredth of the wavelength corresponding to the first frequency band or the second frequency band.

First antenna 11 is an antenna which is connected to first ground member 15 and resonates in the first frequency band. In the present embodiment, first antenna 11 is a reversed F-type antenna which resonates in a 2.4 GHz band. First antenna 11 is formed of a conductive member and has main body part 11*a*, power supply part 11*b*, and short-circuit part 11*c*. In the present embodiment, first antenna 11 is formed with a sheet metal formed of, for example, aluminum or copper. Main body part 11*a* is a portion which is isolated from first ground member 15 and extends along a main surface of substrate 50 where first ground member 15 is arranged. In the present embodiment, as illustrated in FIG. 1, main body part 11*a* has a rectangular shape in a plan view of substrate 50. The sum of electric lengths of two adjacent sides of rectangularly-shaped main body part 11*a* is approximately one fourth the wavelength corresponding to the first frequency band. Power supply part 11*b* is a portion to which the signal in the first frequency band is supplied. Power supply part 11*b* is connected to main body part 11*a* but not directly connected to first ground member 15. Note that power supply part 11*b* is connected to first ground member 15 with main body part 11*a* and short-circuit part 11*c* in between. Power supply part 11*b* penetrates through, for example, first ground member 15 and substrate 50, and a signal is supplied on the rear surface (that is, a main surface on the rear side of the main surface where first ground member 15 is arranged) of substrate 50. Short-circuit part 11*c* is a portion which provides short-circuit between first ground member 15 and main body part 11*a*. Short-circuit part 11*c* is connected to main body part 11*a* and first ground member 15.

Second antenna 21 is an antenna which is connected to second ground member 25 and resonates in the second frequency band different from the first frequency band. In the present embodiment, second antenna 21 is a revered F-type antenna which resonates in a 5 GHz band. Second antenna 21 is formed of a conductive member and has main body part 21*a*, power supply part 21*b*, and short-circuit part 21*c*. In the present embodiment, second antenna 21 is formed with a sheet metal formed of, for example, aluminum or copper. Main body part 21*a* is a portion which is isolated from second ground member 25 and extends along the main surface of substrate 50 where second ground member 25 is arranged. In the present embodiment, as illustrated in FIG. 1, main body part 21*a* has a rectangular shape in a plan view of substrate 50. The sum of electric lengths of two adjacent sides of rectangularly-shaped main body part 21*a* is approximately one fourth the wavelength corresponding to the second frequency band. Power supply part 21*b* is a portion to which the signal in the second frequency band is supplied. Power supply part 21*b* is connected to main body part 21*a* but not directly connected to second ground member 25. Note that power supply part 21*b* is connected to second ground member 25 with main body part 21*a* and short-circuit part 21*c* in between. For example, power supply part 21*b* passes through second ground member 25 and substrate 50 and receives supply of a signal on the rear surface (that is, the main surface on the rear side of the main surface where second ground member 25 is arranged) of substrate 50. Short-circuit part 21*c* is a portion which provides short circuit between second ground member 25 and main body part 21*a*. Short-circuit part 21*c* is connected to main body part 21*a* and second ground member 25.

Substrate 50 is an electrically insulated plate-shaped member which serves as a base for antenna device 1. Substrate 50 has first antenna 11, first ground member 15, second antenna 21, second ground member 25, first filter 31, and second filter 32 arranged on one of main surfaces. In the present embodiment, substrate 50 is a rectangular, plate-shaped dielectric. Substrate 50 is, for example, a glass epoxy substrate.

First filter 31 is a frequency filter which connects first ground member 15 and second ground member 25 and attenuates the signal in the first frequency band. In the present embodiment, first filter 31 attenuates the signal in the first frequency band more than the signal in the second frequency band. First filter 31 is arranged at a position where the distance from first antenna 11 is less than or equal to one half of the wavelength corresponding to the first frequency band and where the distance from second antenna 21 is less than or equal to one half of the wavelength corresponding to the second frequency band.

Figure 2A:
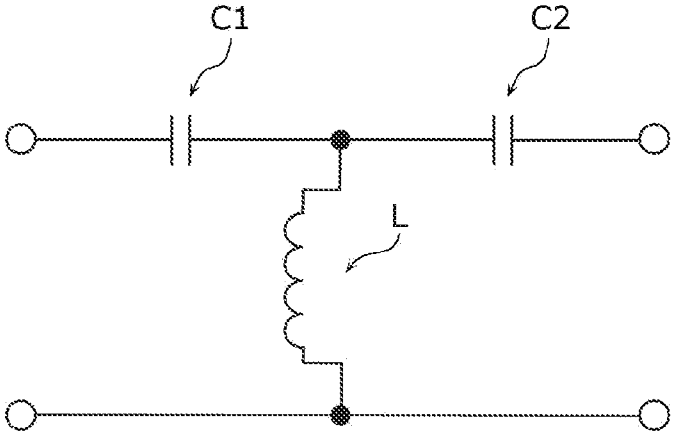
FIG. 2A is a circuit diagram illustrating a configuration example of a first filter according to Embodiment 1.
Figure 2B:
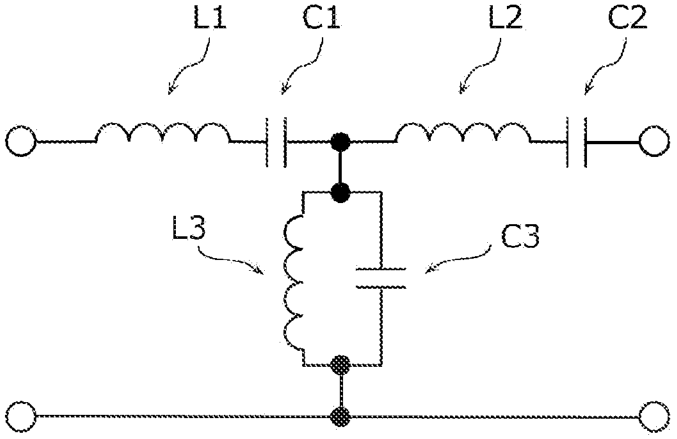
FIG. 2B is a circuit diagram illustrating a general configuration of the first filter according to Embodiment 1.

For example, a bypass filter having capacitors can be used as first filter 31 which attenuates the signal in the first frequency band. First filter 31 is connected to first ground member 15 and second ground member 25 across gap 60. One example of first filter 31 will be described with reference to FIG. 2A. FIG. 2A is a circuit diagram illustrating a configuration example of first filter 31 according to the present embodiment. As illustrated in FIG. 2A, first filter 31 has: two capacitors C1 and C2 which are serially connected; and an inductor L which is connected between tracks between two capacitors C1 and C2. For example, the capacitance of capacitors C1 and C2 is 0.3 pF and the inductance of inductor L is 5.3 nH. The capacitance of capacitors C1 and C2 may be 0.36 pF and the inductance of inductor L may be 3nH. First filter 31 having such a circuit configuration makes it possible to realize a frequency filter which attenuate the signal in the first frequency band and permits the passage of the signal in the second frequency band therethrough. Moreover, a circuit obtained by plurally and serially connecting the circuit illustrated in FIG. 2A may be used as first filter 31. Note that the configuration of first filter 31 is not limited to such a configuration. Hereinafter, a general circuit configuration of first filter 31 will be described with reference to FIG. 2B. FIG.2B is a circuit diagram illustrating a general configuration of first filter 31 according to the present embodiment. As illustrated in FIG. 2B, first filter 31 has: two capacitors C1 and C2 which are serially connected; two inductors L1 and L2; and capacitor C3 and inductor L3 which are connected in a flat row. Adjusting the capacitance of each capacitor and the inductance of each inductor makes it possible to realize first filter 31 which has desired frequency characteristics. A circuit obtained by plurally and serially connecting the circuit illustrated in FIG. 2B may be used as first filter 31. First filter 31 may also be a so-called meta material which has a circuit configuration as illustrated in FIGS. 2A and 2B.

Second filter 32 is a frequency filter which connects first ground member 15 and second ground member 25 at a position different from the corresponding position for first filter 31 and attenuates the signal in the first frequency band less than first filter 31. In the present embodiment, second filter 32 permits the passage of the signal in the first frequency band therethrough. For example, the attenuation of the signal in the first frequency band may be smaller on the second filter than on first filter 31 by 3 dB or more. Moreover, the signal in the second frequency band may be attenuated on second filter 32. In the present embodiment, second filter 32 attenuates the signal in the second frequency band more than the signal in the first frequency band. Second filter 32 is arranged at a position where the distance from first antenna 11 is less than or equal to one half of the wavelength corresponding to the first frequency band and the distance from second antenna 21 is less than or equal to one half of the wavelength corresponding to the second frequency band.

For example, a low pass filter having inductors may be used as second filter 32 which attenuates the signal in the second frequency band. Second filter 32 is connected to first ground member 15 and second ground member 25 across gap 60. Second filter 32 is also typically represented by the circuit illustrated in FIG. 2B as is the case with first filter 31. The circuit configuration on second filter 32 according to the present embodiment is appropriately determined in accordance with required frequency characteristics. A circuit in which the circuit illustrated in FIG. 2B is plurally and serially connected may be used as second filter 32. Moreover, second filter 32 may be a so-called meta material which has a circuit configuration as illustrated in FIG. 2B.

[1-2. Action and Effect]

Next, the action and effect of antenna device 1 according to the present embodiment will be described. The directivity of each of first antenna 11 and second antenna 21 according to antenna device 1 according to the present embodiment depends on not only the shapes of first antenna 11 and second antenna 21 but also the shape and dimension of the grounds connected. For example, the directivity of first antenna 11 depends on the shape and dimension of first ground member 15 connected. Thus, it is possible to adjust the shape and dimension of first ground member 15 in order to adjust the directivity of first antenna 11, but the degree of freedom in the shape and dimension of first ground member 15 can be limited by, for example, surrounding members such as second ground member 25. The freedom in the shape and dimension of first ground member 15 cannot be adjusted in order to adjust the directivity of first antenna 11 as described above in some cases.

However, antenna device 1 according to the present embodiment includes second filter 32 which permits the passage of the signal in the first frequency band resonating at first antenna 11 therethrough, which thus makes it possible to enlarge a region functioning as a ground for the signal in the first frequency band to an outside of a region of first ground member 15. That is, second filter 32 makes it possible to transmit at least part of the signal in the first frequency band to second ground member 25, so that a region of second ground member 25 located closely to second filter 32 functions as a ground for the signal in the first frequency band.

Moreover, when part of the signal in the first frequency band passes through first filter 31, at least part of the signal in the first frequency band resonating at first antenna 11 can be transmitted to second ground member 25 through first filter 31. Thus, a region of second ground member 25 located closely to first filter 31 also functions as a ground for the signal in the first frequency band.

Here, the size of the region of second ground member 25 functioning as the ground for the signal in the first frequency band varies depending on the degree of attenuation of the signal in the first frequency band on first filter 31. Thus, the size of the region of second ground member 25 functioning as the ground for the signal in the first frequency band is greater at the vicinity of first filter 31 than at the vicinity of second filter 32. As described above, the size of the region functioning as the ground for the signal in the first frequency band varies in accordance with the degree of attenuation for the signal in the first frequency band on first filter 31 and second filter 32.

As described above, the region of second ground member 25 functioning as the ground for the signal in the first frequency band resonating at first antenna 11 varies in accordance with the arrangement and frequency characteristics of first filter 31 and second filter 32. Therefore, the shape and dimension of the region functioning as the ground for the signal in the first frequency band can be adjusted by adjusting the arrangement and frequency characteristics of first filter 31 and second filter 32. Consequently, it is possible to adjust the directivity of first antenna 11

Moreover, since the distance from first antenna 11 is less than or equal to one half of the wavelength corresponding to the first frequency band in each of first filter 31 and second filter 32 in the present embodiment, the aforementioned effect is even more remarkable.

Moreover, the directivity of first antenna 11 has been described above, but the directivity of second antenna 21 can also be adjusted by adjusting the arrangement and frequency characteristics of first filter 31 and second filter 32, as is the case with the directivity of first filter 31. For example, second filter 32 may attenuate the signal in the second frequency band and the attenuation of the signal in the second frequency band may be smaller on first filter 31 than on second filter 32. For example, the attenuation of the signal in the second frequency band may be smaller on first filter 31 than on second filter 32 by 3 dB or more. As a result of the passage of the signal in the second frequency band through first filter 31, the region of first ground member 15 located closely to first filter 31 functions as a ground for the signal in the second frequency band. When part of the signal in the second frequency band passes through second filter 32, at least part of the signal in the second frequency band can be transmitted from second ground member 25 to first ground member 15 through second filter 32. Thus, the region of first ground member 15 located closely to second filter 32 also functions as a ground for the signal in the second frequency band.

As described above, the region of first ground member 15 functioning as the ground for the signal in the second frequency band resonating at second antenna 21 varies in accordance with the arrangement and frequency characteristics of first filter 31 and second filter 32. Therefore, the arrangement and frequency characteristics of first filter 31 and second filter 32 can be adjusted to adjust the shape and dimension of the region functioning as the ground for the signal in the second frequency band. Consequently, it is possible to adjust the directivity of second antenna 21.

Moreover, since the distance from second antenna 21 is less than or equal to one half of the wavelength corresponding to the second frequency band on each of first filter 31 and second filter 32 in the present embodiment, the aforementioned effect is even more remarkable.

Antenna device 1 according to the present embodiment includes two filters including first filter 31 and second filter 32, but antenna device 1 may include three or more filters which are arranged at mutually different positions and connect first ground member 15 and second ground member 25. Consequently, the directivity of each of first antenna 11 and second antenna 21 can be more finely adjusted.

Embodiment 2

An antenna device according to Embodiment 2 will be described. The antenna device according to the present embodiment differs from the antenna device according to Embodiment 1 mainly in the total number of antennas and the shapes of ground members. Hereinafter, the antenna device according to the present embodiment will be described, focusing on the differences from antenna device 1 according to Embodiment 1.

[2-1. Configuration]

Figure 3:
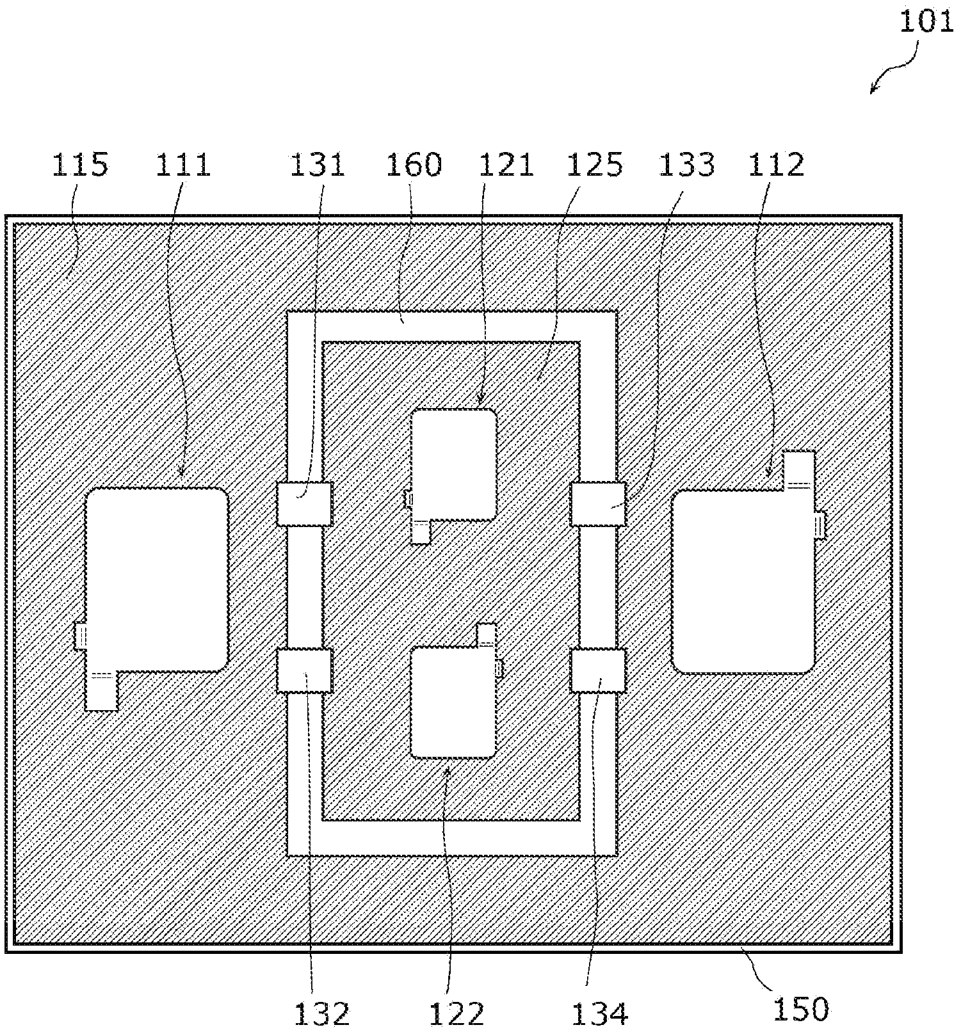
FIG. 3 is a schematic plan view illustrating a configuration of an antenna device according to Embodiment 2.

First, the configuration of the antenna device according to the present embodiment will be described with reference to FIG. 3. FIG. 3 is a schematic plan view illustrating the configuration of antenna device 101 according to the present embodiment. As is the case with antenna device 1 according to Embodiment 1, antenna device 101 transmits and receives a signal in a first frequency band and a signal in a second frequency band different from the first frequency band. As illustrated in FIG. 3, antenna device 101 includes first ground member 115, two first antennas 111 and 112, second ground member 125, two second antennas 121 and 122, two first filters 131 and 133, and two second filters 132 and 134. Antenna device 101 further includes substrate 150 in the present embodiment.

First ground member 115 is a conductive member which is connected to a ground. In the present embodiment, first ground member 115 has an annular shape and is arranged in a region around second ground member 125 on substrate 150.

Second ground member 125 is a conductive member which is arranged at a position adjacent to first ground member 115 with gap 160 in between and connected to a ground different from the ground to which first ground member 115 is connected. The shape of second ground member 125 is not specifically limited. In the present embodiment, second ground member 125 has a rectangular shape and is arranged in a region on substrate 150 surrounded by a region where first ground member 115 is arranged. Gap 160 is a portion which electrically insulates first ground member 115 and second ground member 125. Gap 160 is a void which has a width of approximately 1 mm in the present embodiment.

First antennas 111 and antenna 112 are antennas which are connected to first ground member 115 and resonate in the first frequency band. In the present embodiment, first antennas 111 and 112 have the same configuration as the configuration of first antenna 11 according to Embodiment 1. As illustrated in FIG. 3, first antennas 111 and 112 are respectively arranged on the left and right of second ground member 125.

Second antennas 121 and 122 are antennas which are connected to second ground member 125 and resonate in the second frequency band different from the first frequency band. In the present embodiment, second antennas 121 and 122 have the same configuration as the configuration of second antenna 21 according to Embodiment 1.

Substrate 150 is an electrically insulating plate-shaped member which serves as a base for antenna device 101. Arranged on one main surface of substrate 150 are: first antennas 111 and 112, first ground member 115, second antennas 121 and 122, second ground member 125, first filters 131 and 133, and second filters 132 and 134.

Each of first filters 13 land 133 and second filters 132 and 134 is a frequency filter which connects first ground member 115 and second ground member 125. First filters 13 land 133 have the same configuration as the configuration of first filter 31 according to Embodiment 1 and attenuate the signal in the first frequency band. Second filters 132 and 134 have the same configuration as the configuration of second filter 32 according to Embodiment 1, attenuate the signal in the first frequency band less than first filters 13 land 133, and permit the passage of the signal in the first frequency band therethrough. First filter 131 and second filter 132 are arranged between first antenna 111 and second ground member 125. First filter 133 and second filter 134 are arranged between first antenna 112 and second ground member 125.

In the present embodiment, each of first filters 131 and 133 and second filters 132 and 134 is arranged at a position where the distance from either of two first antennas 111 and 112 is less than or equal to one half of the wavelength corresponding to the first frequency band. Moreover, each of first filters 13 land 133 and second filters 132 and 134 is arranged at a position where the distance from either of second antennas 121 and 122 is less than or equal to one half of the wavelength corresponding to the second frequency band.

[2-2. Action and Effect]

Next, the action and effect of antenna device 101 according to the present embodiment will be described. As is the case with antenna device 1 according to Embodiment 1, antenna device 101 according to the present embodiment includes second filters 132 and 134 which connect first ground member 115 and second ground member 125 and permits the passage of the signal in the first frequency band therethrough. Consequently, at least part of the signal in the first frequency band can be transmitted to second ground member 125 by second filters 132 and 134, and thus a region of second ground member 125 located closely to second filters 132 and 134 functions as a ground for the signal in the first frequency band resonating at each first antenna.

Moreover, when part of the signal in the first frequency band resonating at first antennas 111 and 112 passes through first filters 13 land 133, a region of second ground member 125 located closely to first filters 131 and 133 also functions as a ground for the signal in the first frequency band.

As described above, the region of second ground member 125 which functions as the ground for the signal in the first frequency band resonating at first antennas 111 and 112 varies in accordance with the arrangement and frequency characteristics of first filters 131 and 133 and second filters 132 and 134. Therefore, the shape and dimension of the region which functions as the ground for the signal in the first frequency band can be adjusted by adjusting the arrangement and frequency characteristics of first filters 13 land 133 and second filters 132 and 134. Consequently, it is possible to adjust the directivity of first antennas 111 and 112.

Moreover, the directivity of first antennas 111 and 112 has been described above, and as is the case with first antennas 111 and 112, the directivity of second antennas 121 and 122 can be adjusted by adjusting the arrangement and frequency characteristics of first filters 131 and 133 and second filters 132 and 134.

Embodiment 3

An antenna device according to Embodiment 3 will be described. The antenna device according to the present embodiment differs from antenna device 101 according to Embodiment 2 mainly in the configuration of a gap between the first ground member and the second ground member. The antenna device according to the present embodiment will be described below, focusing on the difference from antenna device 101 according to Embodiment 2.

Figure 4:
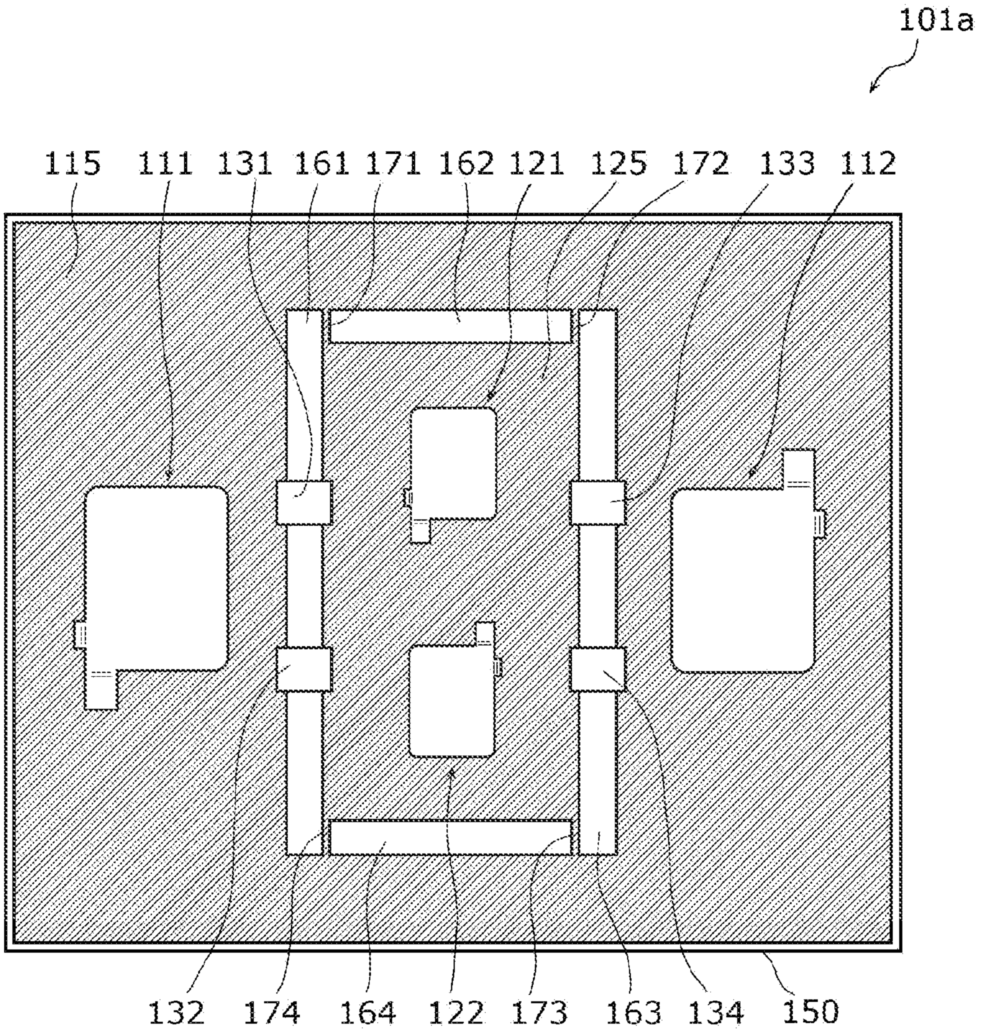
FIG. 4 is a schematic plan view illustrating a configuration of an antenna device according to Embodiment 3.

First, the configuration of the antenna device according to the present embodiment will be described with reference to FIG. 4. FIG. 4 is a schematic plan view illustrating the configuration of antenna device 101*a* according to the present embodiment. As is the case with antenna device 101 according to Embodiment 2, antenna device 101*a* transmits and receives the signal in the first frequency band and the signal in the second frequency band different from the first frequency band. As illustrated in FIG. 4, antenna device 101*a* includes first ground member 115, first antennas 111 and 112, second ground member 125, second antennas 121 and 122, first filters 131 and 133, second filters 132 and 134, and substrate 150. Antenna device 101*a* according to the present embodiment further includes conductive members 171 to 174. In the present embodiment, second ground member 125 is arranged next to first ground member 115 with spaces 161 to 164 and conductive members 171 to 174 in between.

Conductive members 171 to 174 are conductive members which achieve conduction between first ground member 115 and second ground member 125. Consequently, conductive members 171 to 174 divide the space between first ground member 115 and second ground member 125. The distance from each of conductive members 171 to 174 to first antenna 111 and the distance from each of conductive members 171 to 174 to first antenna 112 are longer than one half of the wavelength corresponding to the first frequency band. Consequently, the characteristics of first antennas 111 and 112 do not substantially vary depending on whether conductive members 171 to 174 are present or absent. That is, the influence of conductive members 171 to 174 on first antennas 111 and 112 is ignorable. Moreover, the distance from each of conductive members 171 to 174 to second antenna 121 and the distance from each of conductive members 171 to 174 to second antenna 122 are longer than one half of the wavelength corresponding to the second frequency band. Consequently, the characteristics of second antennas 121 and 122 do not substantially vary depending on whether conductive members 171 to 174 is present or absent. That is, the influence of conductive members 171 to 174 on second antennas 121 and 122 is ignorable. The widths of conductive members 171 to 174 are not specifically limited, but are less than or equal to approximately one two hundredth respective wavelengths corresponding to the first frequency band and the second frequency band in the present embodiment.

[3-2. Action and Effect]

Next, the action and effect of antenna device 101*a* according to the present embodiment will be described in comparison to antenna device 101 according to Embodiment 2. First ground member 115 has an annular inner peripheral edge in antenna device 101 according to Embodiment 2. Here, a current is likely to flow at an edge of the conductive member forming a general antenna, and thus the current can flow along the aforementioned inner peripheral edge. Thus, the inner peripheral edge functions as an antenna, so that unnecessary electromagnetic waves may be generated. Similarly, the outer peripheral edge of second ground member 125 also functions as an antenna, so that unnecessary electromagnetic waves may be generated. On the contrary, in antenna device 101*a* according to the present embodiment, the space between first ground member 115 and second ground member 125 is divided into four spaces 161 to 164 by conductive members 171 to 174. Accordingly, the inner peripheral edge of first ground member 115 and the outer peripheral edge of second ground member 125 are also divided. Thus, the generation of the unnecessary electromagnetic waves at the inner peripheral edge of first ground member 115 and the outer peripheral edge of second ground member 125 can be suppressed.

Note that, in the present embodiment, antenna device 101*a* includes four conductive members 171 to 174, but the total number of conductive members is not limited to four and is only required to be one or more.

Embodiment 4

An antenna device according to Embodiment 4 will be described. The antenna device according to the present embodiment differs from antenna device 1 according to Embodiment 1 mainly in that a conductive member capable of having influence on the directivity of each antenna is further provided. Hereinafter, the antenna device according to the present embodiment will be described, focusing on the difference from antenna device 1 according to Embodiment 1.

[4-1 Configuration]

Figure 5:
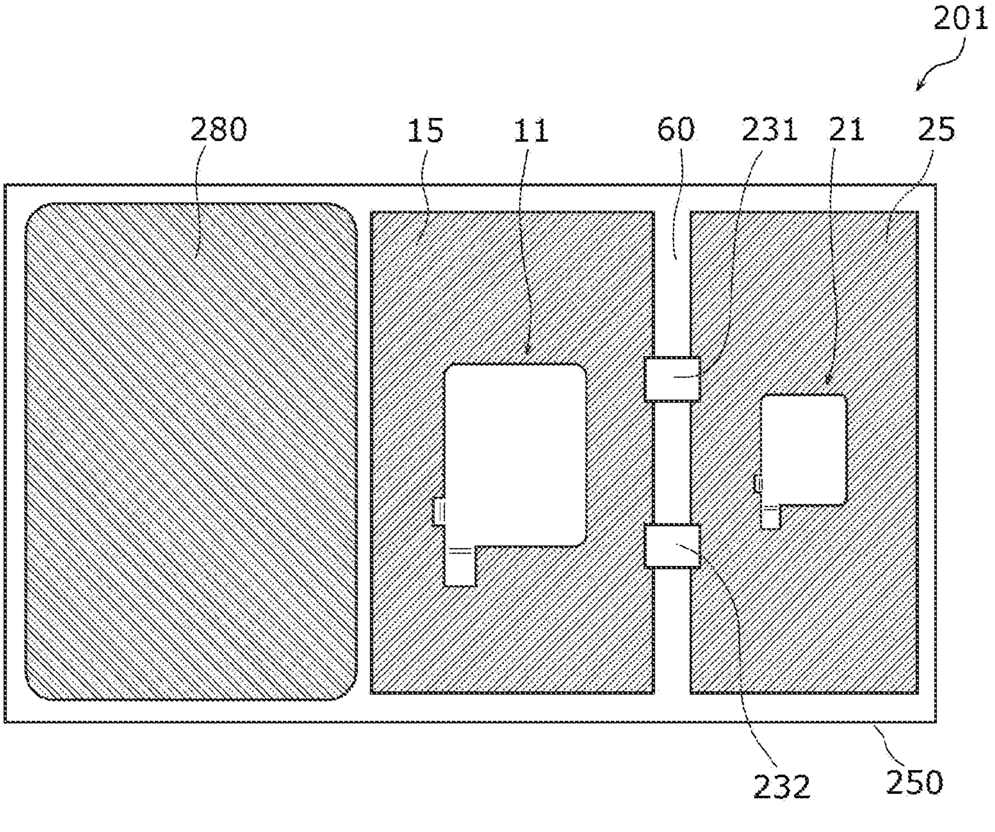
FIG. 5 is a schematic plan view illustrating a configuration of an antenna device according to Embodiment 4.

First, the configuration of the antenna device according to the present embodiment will be described with reference to FIG. 5. FIG. 5 is a schematic plan view illustrating the configuration of antenna device 201 according to the present embodiment. As illustrated in FIG. 5, antenna device 201 includes first ground member 15, first antenna 11, second ground member 25, second antenna 21, first filter 231, second filter 232, substrate 250, and peripheral circuit 280.

Substrate 250 is an electrically insulating plate-shaped member which serves as a base for antenna device 201. As is the case with substrate 50 according to Embodiment 1, first antenna 11, first ground member 15, second antenna 21, second ground member 25, first filter 231, and second filter 232 are arranged on one of main surfaces of substrate 250. In the present embodiment, peripheral circuit 280 is further arranged on one of the main surfaces of substrate 250.

Peripheral circuit 280 is a circuit which is arranged on substrate 250 and is one example of the conductive member included in antenna device 201. In the present embodiment, peripheral circuit 280 is arranged at a position adjacent to first ground member 15 and opposite to second ground member 25 with respect to first antenna 11. In other words, first antenna 11 is arranged between peripheral circuit 280 and second ground member 25. The configuration of peripheral circuit 280 is not specifically limited. Peripheral circuit 280 may be, for example, a circuit which generates or extracts a signal supplied to first antenna 11 and second antenna 21 or may be, for example, a circuit which extracts signals with a predetermined frequency from the signals received by first antenna 11 and second antenna 21.

As is the case with first filter 31 according to Embodiment 1, first filter 231 is a frequency filter which connects first ground member 15 and second ground member 25 and attenuates the signal in the first frequency band. In the present embodiment, first filter 231 attenuates the signal in the first frequency band more than the signal in the second frequency band. First filter 231 permits the passage of the signal in the second frequency band therethrough.

As is the case with second filter 32 according to Embodiment 1, second filter 232 is a frequency filter which connects first ground member 15 and second ground member 25 and attenuates the signal in the first frequency band more than the signal in the second frequency band. In the present embodiment, second filter 232 attenuates the signal in the second frequency band more than the signal in the first frequency band. Second filter 232 permits the passage of the signal in the first frequency band therethrough.

[4-2. Action and Effect]

Next, the action and effect of antenna device 201 according to the present embodiment will be described. Antenna device 201 according to the present embodiment includes peripheral circuit 280 as described above. Peripheral circuit 280 includes many conductive members such as a ground wire and thus can have influence on the directivity of each antenna included in antenna device 201. More specifically, the directivity of the antenna can be biased in a direction opposite to the direction from the antenna to the conductive member. In the example illustrated in FIG. 5, peripheral circuit 280 has the greatest influence on the directivity of first antenna 11 arranged at a position adjacent to peripheral circuit 280. More specifically, as a result of the arrangement of peripheral circuit 280, the directivity of first antenna 11 can be biased in the direction (that is, a direction from first antenna 11 to second ground member 25) opposite to the direction from first antenna 11 to peripheral circuit 280.

However, in the present embodiment, at least second filter 232 permits the passage of the signal in the first frequency band therethrough. Consequently, a region of second ground member 25 located closely to second filter 232 functions as a ground for the signal in the first frequency band resonating at first antenna 11. Thus, effect as if first ground member 15 is enlarged to an area where second ground member 25 is arranged is provided. Therefore, the directivity of first antenna 11 biased in a direction towards second ground member 25 can be suppressed. Moreover, antenna device 201 may further include, in addition to first filter 231 and second filter 232, a frequency filter which connects first ground member 15 and second ground member 25 and permits the passage of the signal in the first frequency band therethrough. Consequently, the influence of peripheral circuit 280 on the directivity of first antenna 11 can be even more suppressed.

Embodiment 5

An antenna device according to Embodiment 5 will be described. As is the case with antenna device 201 according to Embodiment 4, the antenna device according to the present embodiment includes a conductive member which can have influence on the directivity of each antenna. The antenna device according to the present embodiment differs from antenna device 201 according to Embodiment 4 in the configuration of the conductive member. Hereinafter, the antenna device according to the present embodiment will be described, focusing on the difference from antenna device 201 according to Embodiment 4.

[5-1. Configuration]

Figure 6:
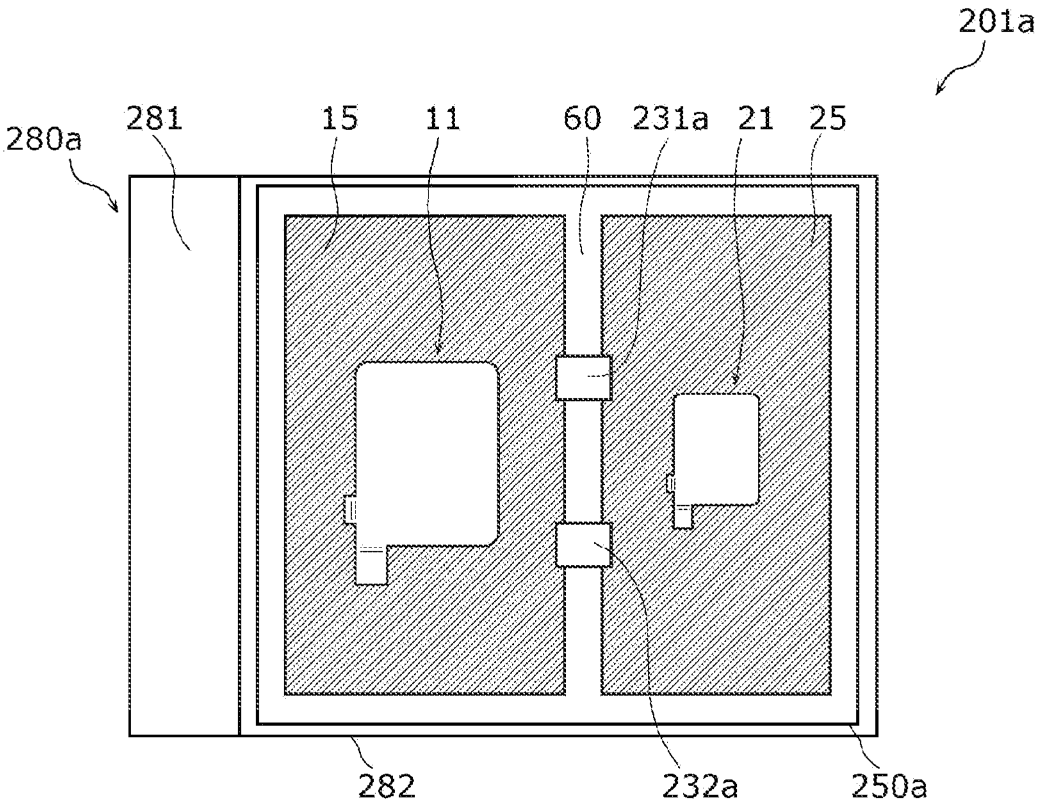
FIG. 6 is a schematic plan view illustrating a configuration of an antenna device according to Embodiment 5.
Figure 7:
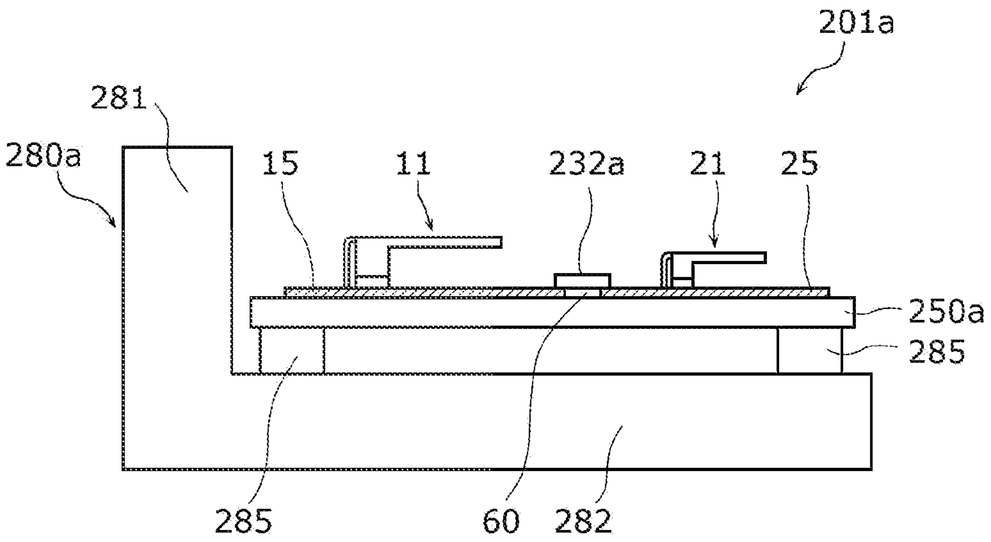
FIG. 7 is a schematic side view illustrating a configuration of the antenna device according to Embodiment 5.

First, the configuration of the antenna device according to the present embodiment will be described with reference to FIGS. 6 and 7. FIGS. 6 and 7 are respectively a schematic view and side view illustrating the configuration of antenna device 201*a* according to the present embodiment. As illustrated in FIGS. 6 and 7, antenna device 201*a* according to the present embodiment includes first ground member 15, first antenna 11, second ground member 25, second antenna 21, first filter 231*a*, second filter 232*a*, substrate 250*a*, frame 280*a*, and support 285.

Substrate 250*a* is an electrically insulating plate-shaped member which serves as a base for antenna device 201*a*. As is the case with substrate 250 according to Embodiment 4, first antenna 11, first ground member 15, second antenna 21, second ground member 25, first filter 231*a*, and second filter 232*b* are arranged on one main surface of substrate 250*a*. In the present embodiment, substrate 250*a* is arranged on frame 280*a* with support 285 in between, as illustrated in FIG. 7. Note that substrate 250*a* may be directly arranged on frame 280*a* without support 285 in between.

Frame 280*a* is a structure with substrate 250*a* fixed thereon and is one example of the conductive member which is included in antenna device 201*a*. Frame 280*a* includes wall part 281 and pedestal part 282. Frame 280*a* is formed of a conductive material such as, for example, aluminum or magnesium.

Wall part 281 is a plate-shaped portion which is provided upright on pedestal part 282. As illustrated in FIG. 7, the length of wall part 281 from pedestal part 282 is longer than the distance from pedestal part 282 to first antenna 11 and second antenna 21. In the present embodiment, wall part 281 is arranged at a position adjacent to first ground member 15 and opposite to second ground member 25 with respect to first antenna 11. In other words, first antenna 11 is arranged between wall part 281 and second ground member 25.

Pedestal part 282 is a plate-shaped portion on which substrate 250*a* is arranged. In the present embodiment, pedestal part 282 has a loading surface the dimension of which is greater than the dimension of the main surface of substrate 250*a*, and substrate 250*a* is arranged on the aforementioned loading surface.

Support 285 is a member which is arranged between frame 280*a* and substrate 250*a*. Support 285 is connected to frame 280*a* and substrate 250*a*. Support 285 may be connected to frame 280*a* and substrate 250*a* with an adhesive agent or the like or a screw or the like. Antenna device 201*a* according to the present embodiment includes four cylindrically-shaped supports 285, which are respectively arranged at four corners of substrate 250*a*. Moreover, frame 280*a* is connected to one of two circular bottom surfaces of cylindrically shaped support 285 and substrate 250*a* is connected to the other one of the bottom surfaces of support 285.

First filter 231*a* is a frequency filter which connects first ground member 15 and second ground member 25 and attenuates the signal in the first frequency band, as is the case with first filter 231 according to Embodiment 4. In the present embodiment, first filter 231*a* attenuates the signal in the first frequency band more than the second frequency band. First filter 231*a* may attenuate or may not attenuate the signal in the second frequency band.

Second filter 232*a* is a frequency filter which connects first ground member 15 and second ground member 25 and attenuates the signal in the first frequency band less than first filter 231*a*, as is the case with second filter 232 according to Embodiment 4. In the present embodiment, second filter 232*a* may attenuate or may not attenuate the signal in the second frequency band.

[5-2. Action and Effect]

Next, the action and effect of antenna device 201*a* according to the present embodiment will be described. Antenna device 201*a* according to the present embodiment includes frame 280*a* as described above. Frame 280*a* is a conductive member and thus can have influence on the directivity of each antenna included in antenna device 201*a*. More specifically, the directivity of the antenna can be biased in a direction opposite to the direction from the antenna towards the conductive member. In the examples illustrated in FIGS. 6 and 7, frame 280*a* has the greatest influence on the directivity of first antenna 11 arranged at a position adjacent to wall part 281. More specifically, as a result of the arrangement of frame 280*a*, the directivity of first antenna 11 can be biased in a direction opposite to the direction from first antenna 11 towards frame 280*a* (that is, a direction from first antenna 11 towards second ground member 25).

However, in the present embodiment, at least second filter 232*a* permits the passage of the signal in the first frequency band therethrough. Consequently, a portion of second ground member 25 located closely to second filter 232*a* functions as a ground for the signal in the first frequency band resonating at first antenna 11. Thus, effect as if first ground member 15 is enlarged to a region where second ground member 25 is arranged is provided. Therefore, the bias of the directivity of first antenna 11 in the direction towards second ground member 25 can be suppressed. Moreover, antenna device 201*a* may further include, in addition to first filter 231*a* and second filter 232*a*, a frequency filter which connects first ground member 15 and second ground member 25 and permits the passage of the signal in the first frequency band therethrough. Consequently, the influence of frame 280*a* on the directivity of first antenna 11 can be even more suppressed Embodiment 6

An antenna device according to Embodiment 6 will be described. The antenna device according to the present embodiment differs from antenna device 101 according to Embodiment 2, etc. mainly in the total number and arrangement of antennas and filters. Hereinafter, the antenna device according to the present embodiment will be described, focusing on the differences from antenna device 101 according to Embodiment 2.

[6-1. Configuration]

Figure 8:
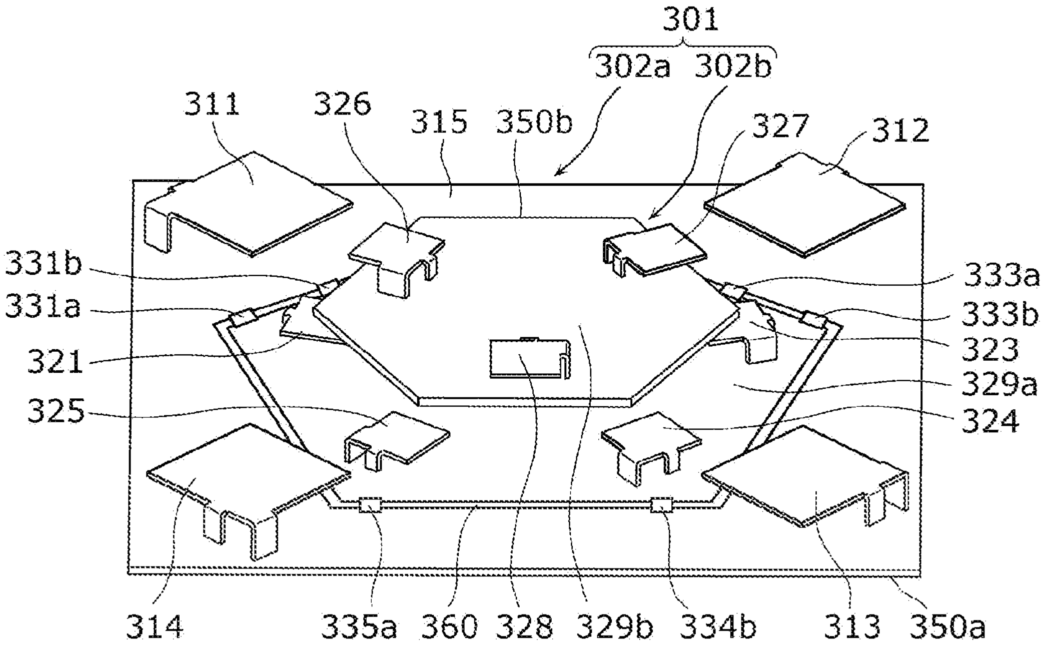
FIG. 8 is a schematic perspective view illustrating a configuration of an antenna device according to Embodiment 6.
Figure 9:
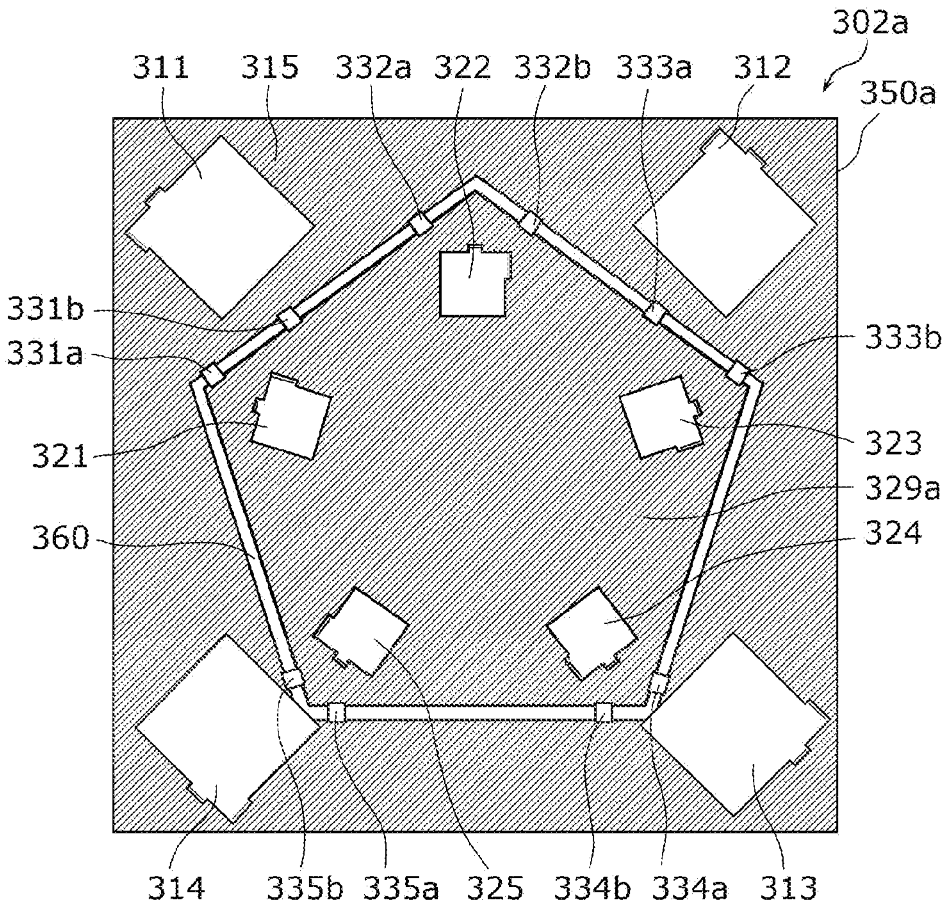
FIG. 9 is a schematic plan view illustrating a configuration of a first layer part of the antenna device according to Embodiment 6.
Figure 10:
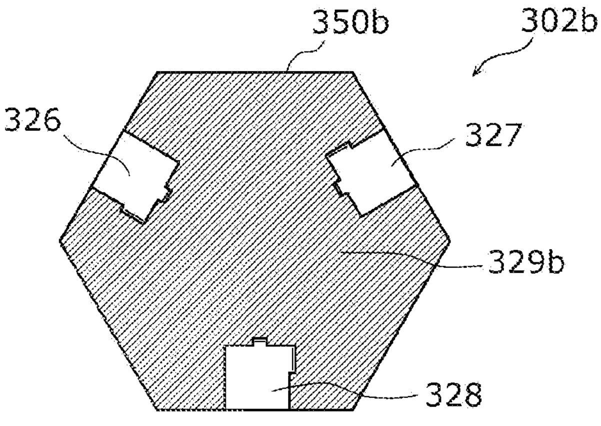
FIG. 10 is a schematic plan view illustrating a configuration of a second layer part of the antenna device according to Embodiment 6.

First, the configuration of the antenna device according to the present embodiment will be described with reference to FIGS. 8 to 10. FIG. 8 is a schematic perspective view illustrating the configuration of antenna device 301 according to the present embodiment. FIG. 9 is a schematic plan view illustrating the configuration of first layer part 302*a* of antenna device 301 according to the present embodiment. FIG. 9 illustrates a plan view of a main surface of substrate 350*a* included in first layer part 302*a*. FIG. 10 is a schematic plan view illustrating the configuration of second layer part 302*b* of antenna device 301 according to the present embodiment. FIG. 10 illustrates a plan view in a plan view of the main surface of substrate 350*b* included in second layer part 302*b*.

As illustrated in FIG. 8, antenna device 301 according to the present embodiment includes: first layer part 302*a*; and second layer part 302*b* which is arranged separately from first layer part 302*a*. In the present embodiment, second layer part 302*b* is arranged in a manner such that the main surface of substrate 350*b* included in second layer part 302*b* is parallel to the main surface of substrate 350*a* included in first layer part 302*a*. Note that, for example, an electrically insulating spacer for fixing relative positions with respect to first layer part 302*a* and second layer part 302*b* is arranged between first layer part 302*a* and second layer part 302*b*, which is not illustrated.

As illustrated in FIG. 9, first layer part 302*a* includes first ground member 315, first antennas 311 to 314, second ground member 329*a*, second antennas 321 to 325, first filters 331*a*, 333*a*, 334*a*, and 335*a*, second filters 331*b*, 333*b*, 334*b*, and 335*b*, third filter 332*a*, fourth filter 332*b*, and substrate 350*a*.

First ground member 315 is a conductive member which is connected to a ground. In the present embodiment, first ground member 315 has an annular shape and is arranged in a region around second ground member 329*a* on substrate 350*a*. First ground member 315 has an outer peripheral edge and an inner peripheral edge shaped into a square shape and a pentagonal shape, respectively.

Each of first antennas 311 to 314 is an antenna which is connected to first ground member 315 and resonates in the first frequency band. In the present embodiment, first antennas 311 to 314 have the same configuration as the configuration of first antenna 11 according to Embodiment 1. As illustrated in FIGS. 8 and 9, each of first antennas 311 to 314 is arranged closely to each vertex of the square-shaped outer peripheral edge of first ground member 315. A distance from each one of the first antennas to the other one of the first antennas located more closely to the aforementioned first antenna is approximately one half of the wavelength corresponding to the first frequency band. That is, the distance between first antenna 311 and first antenna 312, the distance between first antenna 312 and first antenna 313, the distance between first antenna 313 and first antenna 314, and the distance between first antenna 314 and first antenna 311 are approximately one half of the wavelength corresponding to the first frequency band.

Second ground member 329*a* is a conductive member which is arranged at a position adjacent to first ground member 315 with gap 360 in between and is connected to a ground different from the ground to which first ground member 315 is connected. In the present embodiment, second ground member 329*a* has a pentagonal shape and is arranged in a region surrounded by a region on substrate 350*a* where first ground member 315 is arranged. Gap 360 is a region between first ground member 315 and second ground member 329*a*. Gap 360 has a width of approximately 1 mm in the present embodiment.

Each of second antennas 321 to 325 is an antenna which is connected to second ground member 329*a* and resonates in the second frequency band. In the present embodiment, second antennas 321 to 325 have the same configuration as the configuration of second antenna 21 according to Embodiment 1. As illustrated in FIGS. 8 and 9, second antennas 321 to 325 are arranged closely to respective vertexes of second ground member 329*a* of a pentagonal shape. A distance from each one of the second antennas to the closest other one of the second antennas is approximately one half of the wavelength corresponding to the second frequency band. That is, the distance between second antenna 321 and second antenna 322, the distance between second antenna 322 and second antenna 323, the distance between second antenna 323 and second antenna 324, the distance between second antenna 324 and second antenna 325, and the distance between second antenna 325 and second antenna 321 are approximately one half of the wavelength corresponding to the second frequency band.

Substrate 350*a* is an electrically insulating plate-shaped member which serves as a base for first layer part 302*a* of antenna device 301. Arranged on one main surface of substrate 350*a* are: first antennas 311 to 314, first ground member 315, second antennas 321 to 325, second ground member 329*a*, first filters 331*a*, 333*a*, 334*a*, and 335*a*, second filters 331*b*, 333*b*, 334*b*, and 335*b*, third filter 332*a*, and fourth filter 332*b*.

Each of first filters 331*a*, 333*a*, 334*a*, and 335*a*, second filters 331*b*, 333*b*, 334*b*, and 335*b*, third filter 332*a*, and fourth filter 332*b* is a frequency filter which connects first ground member 315 and second ground member 329*a*. First filters 331*a*, 333*a*, 334*a*, and 335*a* have the same configuration as the configuration of first filter 31 according to Embodiment 1 and attenuate the signal in the first frequency band. Second filters 331*b*, 333*b*, 334*b*, and 335*b* have the same configuration as the configuration of second filter 32 according to Embodiment 1, attenuate the signal in the first frequency band less than first filters 331*a*, 333*a*, 334*a*, and 335*a*, and permit the passage of the signal in the first frequency band therethrough. In the present embodiment, third filter 332*a* attenuates the signal in the second frequency band. Fourth filter 332*b* attenuates the second frequency band less than third filter 332*a* and permits the passage of the signal in the second frequency band therethrough.

In the present embodiment, each of the filters arranged in first layer part 302*a* is arranged at a position where the distance from any of four first antennas 311 to 314 is less than or equal to one half of the wavelength corresponding to the first frequency band. Moreover, each filter is arranged at a position where the distance from any of five second antennas 321 to 325 is less than or equal to one half of the wavelength corresponding to the second frequency band.

As illustrated in FIGS. 9 and 10, second layer part 302*b* includes third ground member 329*b*, third antennas 326 to 328, and substrate 350*b*.

Third ground member 329*b* is a conductive member which is connected to a ground different from the ground to which first ground member 315 is connected. Third ground member 329*b* may be connected to, for example, the same ground as the ground to which second ground member 329*a* is connected. In the present embodiment, third ground member 329*b* has a hexagonal shape and is arranged on substrate 350*b*. Third ground member 329*b* is arranged on a plane different from the plane on which second ground member 329*a* is arranged. In the present embodiment, third ground member 329*b* is arranged along second ground member 329*a*.

Each of third antennas 326 to 328 is an antenna which is connected to third ground member 329*b* and resonates in the second frequency band. In the present embodiment, third antennas 326 to 328 have the same configuration as the configuration of second antenna 21 according to Embodiment 1. Each of third antennas 326 to 328 is arranged in a manner such that the distance to the other third antenna is approximately one half of the wavelength corresponding to the second frequency band. Specifically, the distance between third antenna 326 and third antenna 327, the distance between third antenna 327 and third antenna 328, and the distance between third antenna 328 and third antenna 326 are approximately one half of the wavelength corresponding to the second frequency band. Moreover, a distance between third antenna 326 and second antennas 321 and 322 of first layer part 302*a*, a distance between third antenna 327 and second antennas 322 and 323 of first layer part 302*a*, a distance between third antenna 328 and second antennas 324 and 325 of first layer part 302*a* are also approximately one half of the wavelength corresponding to the second frequency band.

Substrate 350*b* is an electrically insulating plate-shaped member which serves as a base for second layer part 302*b* of antenna device 301. Third antennas 326 to 328 and third ground member 329*b* are arranged on one main surface of substrate 350*b*.

[6-2. Action and Effect]

Next, the action and effect of antenna device 301 according to the present embodiment will be described. Antenna device 301 according to the present embodiment includes second filters 331*b*, 333*b*, 334*b*, and 335*b* which connect first ground member 315 and second ground member 329*a* and permit the passage of the signal in the first frequency band therethrough, as is the case with antenna device 1 according to Embodiment 1. Consequently, at least part of the signal in the first frequency band can be transmitted to second ground member 329*a* by each second filter, and thus a region of second ground member 329*a* located closely to each second filter functions as a ground for the signal in the first frequency band resonating at each first antenna.

Moreover, when part of the signal in the first frequency band resonating at each first antenna passes through each first filter, a region of second ground member 329*a* located closely to each first filter also function as a ground for the signal in the first frequency band resonating at each first antenna.

As described above, the region of second ground member 329*a* which functions as the ground for the signal in the first frequency band resonating at each first antenna varies in accordance with the arrangement and frequency characteristics of each filter of first layer part 302*a*. Therefore, the arrangement and frequency characteristics of each filter can be adjusted to adjust the shape and dimension of the region which functions as the ground for the signal in the first frequency band. Consequently, it is possible to adjust the directivity of each first antenna. As is the case with antenna device 301 according to the present embodiment in particular, when second layer part 302*b* is included, for example, third ground member 329*a* included in second layer part 302*b* can have influence on the directivity of each first antenna. The arrangement and frequency characteristics of each filter can also be adjusted to adjust the directivity of each first antenna so as to suppress the aforementioned influence in such antenna device 301.

The directivity of each first antenna has been described above, but the directivity of each second antenna included in first layer part 302*a* can also be adjusted by adjusting the arrangement and frequency characteristics of each filter, as is the case with each first antenna. In particular, the influence of second layer part 302*b* on the directivity of each second antenna arranged at first layer part 302*a* is large in antenna device 301 according to the present embodiment. The arrangement and frequency characteristics of each filter can be adjusted to adjust the directivity of each second antenna so as to suppress the aforementioned influence in such antenna device 301.

Moreover, antenna device 301 includes four first antennas 311 to 314 resonating in the first frequency band and is thus applicable to 4*x*4 multiple-input and multiple-output (MIMO) in the signal in the first frequency band. Moreover, antenna device 301 includes the eight antennas (second antennas 321 to 325 and third antennas 326 to 328) resonating in the second frequency band and is thus applicable to 8*x*8 MIMO in the second frequency band.

[6-3. Variation]

Next, an antenna device according to a variation of the present embodiment will be described. The shape of second ground member 329*a* in antenna device 301 according to Embodiment 6 is a pentagonal shape, but the shape of second ground member 329*a* is not limited to the aforementioned shape. Hereinafter, the antenna device according to the present variation will be described, referring to an example in which the shape of second ground member 329*a* is not a pentagonal shape.

The shape of second ground member 329*a* is a square shape having the same total number of sides as the total number of first antennas in the antenna device according to the present variation.

Moreover, the shape of the inner peripheral edge of first ground member 315 is a square shape as is the case with second ground member 329*a* in the antenna device according to the present variation.

In this case, each first antenna may be arranged at a position opposing the vicinity of the center of each side of the inner peripheral edge of the rectangular shape of first ground member 315

Figure 11:
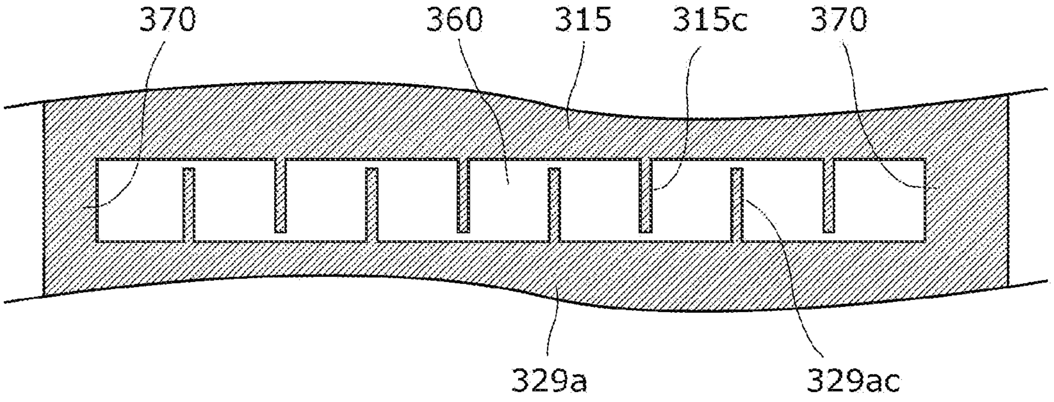
FIG. 11 is a schematic plan view illustrating a configuration of a gap of an antenna device according to a variation of Embodiment 6.

Moreover, the shape of gap 360 in the present variation may also be different from the shape of the gap of antenna device 301 according to Embodiment 6. Hereinafter, gap 360 of the antenna device according to the present variation will be described with reference to FIG. 11. FIG. 11 is a schematic plan view illustrating a configuration of gap 360 of the antenna device according to the present variation. FIG. 11 illustrates only one side of gap 360 of a square shape.

As illustrated in FIG. 11, the antenna device according to the present variation includes conductive members 370, as is the case with antenna device 101*a* according to Embodiment 3. In the present variation, four conductive members 370 are respectively arranged at positions corresponding to four vertexes of second ground member 329*a* of a square shape. That is, first ground member 315 and second ground member 329*a* are conducted at each of the vertexes of gap 360 of a square shape by conductive members 370. Consequently, the same effect as that provided by antenna device 101*a* according to Embodiment 3 can also be provided in the antenna device according to the present variation.

Moreover, as is the case with the antenna device according to the present variation, when first ground member 315 and second ground member 329*a* are conducted by conductive members 370, the antenna device may not include any first filter and second filter.

Moreover, as illustrated in FIG. 11, first ground member 315 has a plurality of first convex parts 315*c* which project towards second ground member 329*a* at the inner peripheral edge in the present variation. In the example illustrated in FIG. 11, the plurality of first convex parts 315*c* are arranged at equal intervals and have the same length. Moreover, second ground member 329*a* has a plurality of second convex parts 329*ac* which project towards first ground member 315 at the outer peripheral edge. In the example illustrated in FIG. 11, the plurality of second convex parts 329*ac* are arranged at equal intervals and have the same length. That is, each of the inner peripheral edge of first ground member 315 and the outer peripheral edge of second ground member 329*a* is comb-shaped.

The plurality of first convex parts 315*c* and the plurality of second convex parts 329*ac* are arranged alternately. In other words, one second convex part 329*ac* is arranged between two adjacent first convex parts 315*c* and one first convex part 315*c* is arranged between two adjacent second convex parts 329*ac*. With the plurality of first convex parts 315*c* of first ground member 315 and the plurality of second convex parts 329*ac* of second ground member 329*a*, part of the signal in the first frequency band can be transmitted from first ground member 315 to second ground member 329*a* and part of the signal in the second frequency band can be transmitted from second ground member 329*a* to first ground member 315. Thus, the shapes and dimensions of the plurality of first convex parts 315*c* and the plurality of second convex parts 329*ac* can be adjusted to adjust the region of second ground member 329*a* which functions as the ground for the signal in the first frequency band and adjust the region of first ground member 315 which functions as the ground for the signal in the second frequency band. Therefore, the directivity of each antenna can be adjusted.

As described above, the shapes of the inner peripheral edge of first ground member 315 and the shape of second ground member 329*a* are not limited to a pentagon and may be a polygon other than the pentagon or a shape, such as an oval, other than the polygon. Moreover, the shape of the inner peripheral edge of first ground member 315 and the shape of second ground member 329*a* may be a polygon which has the same total number of vertexes (or sides) as the total number of the first antennas.

Note that the antenna device according to the present variation includes four conductive members 370 but the total number of conductive members 370 is only required to be one or more.

Moreover, the configuration of antenna device 301 according to Embodiment 6 and the configuration of the antenna device according to the present variation may be combined as appropriate. For example, antenna device 301 according to Embodiment 6 may include conductive member 370. Moreover, first ground member 315 of antenna device 301 according to Embodiment 6 may have a plurality of first convex parts 315*c* at the inner peripheral edge thereof, and second ground member 329*a* may have a plurality of second convex parts 329*ac* at the outer peripheral edge thereof. Moreover, first ground member 315 of antenna device 301 according to Embodiment 6 may not include the filters. Moreover, first ground member 315 according to the present variation may not include the plurality of first convex parts 315*c* and second ground member 329*a* may not include the plurality of second convex parts 329*ac*. Moreover, the antenna device according to the present variation may not include conductive members 370 and may include the same filters as the filters of Embodiment 6.

Variation and Others

The antenna device of the present disclosure has been described above based on the embodiments, but the present disclosure is not limited to the embodiments described above. Those obtained by making various modifications, conceivable to those skilled in the art, to the embodiments described above may also be included in the scope of the present disclosure without departing from the spirits of the present disclosure.

For example, the first frequency band is lower than the second frequency band in the embodiments described above, but the first frequency band may be higher than the second frequency band.

A copper film is used as the first ground member and the second ground member in the embodiments described above but any conductive member other than the copper film may be used. For example, a sheet metal formed of copper or aluminum may be used as the first ground member and the second member.

Moreover, a sheet metal is used as the first antenna and the second antenna in the embodiments described above, but a conductive member other than the sheet metal may be used. For example, a conductive film such as a copper film formed on an insulating substrate may also be used as the first antenna and the second antenna.

Each of the gaps between the first ground member and the second ground member is a void in the embodiments described above but the configuration of the gap is not specifically limited as long as the first ground member and the second ground member can be electrically insulated from each other. For example, an insulating material may be filled in the gap.

The width of the gap between the first ground member and the second ground member is fixed in the embodiments described above, but the aforementioned width may not be fixed. For example, the width of the gap may be changed in accordance with the dimension of each filter at the sections where the first filter and the second filter are arranged.

Moreover, the shape of each ground member may be changed as appropriate in the embodiment described above. For example, a slit-like insulation region (that is, a region where the ground members are not formed) may be arranged inside of each ground member. Such an insulation region can be arranged around each antenna to thereby adjust the directivity of each antenna.

Other modes such as a mode realized by combining the components and the functions in the embodiments in a desired manner may also be included in the present disclosure within a scope not departing from the spirits of the present disclosure.

For example, each of the antenna devices according to Embodiments 2, 3, and 6 may include peripheral circuit 280 according to Embodiment 4 or frame 280*a* according to Embodiment 5.

INDUSTRIAL APPLICABILITY

The antenna devices of the present disclosure can transmit and receive signals in a plurality of frequency bands and can also be applicable, as an antenna device capable of adjusting the directivity of antennas, to, for example, a wireless LAN rooter.

The invention claimed is:

1. An antenna device, comprising:
- a first ground member;
- one or more first antennas which are connected to the first ground member and resonate in a first frequency band;
- a second ground member which is arranged at a position adjacent to the first ground member with a gap in between;
- one or more second antennas which are connected to the second ground member and resonate in a second frequency band different from the first frequency band;
- one or more first filters which connect the first ground member and the second ground member and attenuate a signal in the first frequency band; and
- one or more second filters which connect the first ground member and the second ground member at a position different from a position where the one or more first filters connect the first ground member and the second ground member, which attenuate a signal in the second frequency band,
- wherein the one or more second filters attenuate the signal in the first frequency band less than the one or more first filters, and attenuate the signal in the second frequency band more than the one of more first filters.

2. The antenna device according to claim 1, wherein
- each of the one or more first filters and the one or more second filters is arranged at a position where a distance from any of the one or more first antennas is less than or equal to one half of a wavelength corresponding to the first frequency band.

3. The antenna device according to claim 1, wherein
- each of the one or more first filters and the one or more second filters is arranged at a position where a distance from any of the one or more second antennas is less than or equal to one half of a wavelength corresponding to the second frequency band.

4. The antenna device according to claim 1, wherein
- attenuation of the signal in the first frequency band is smaller on the one or more second filters than on the one or more first filters by 3 dB or more.

5. The antenna device according to claim 1, further comprising:
- a conductive member which is arranged at a position adjacent to the first ground member, wherein
- any of the one or more first antennas is arranged between the conductive member and the second ground member.

6. The antenna device according to claim 1, wherein
- the first ground member has an annular shape and is arranged in a region around the second ground member, and
- the antenna device further comprises a conductive member which divides the gap.

7. An antenna device, comprising:

a first ground member;

one or more first antennas which are connected to the first ground member and resonate in a first frequency band;

a second ground member which is arranged at a position adjacent to the first ground member with a gap in between;

one or more second antennas which are connected to the second ground member and resonate in a second frequency band different from the first frequency band;

one or more first filters which connect the first ground member and the second ground member and attenuate a signal in the first frequency band;

one or more second filters which connect the first ground member and the second ground member at a position different from a position where the one or more first filters connect the first ground member and the second ground member, and which attenuate the signal in the first frequency band less than the one or more first filters; and a conductive member which divides the gap, wherein the first ground member has an annular shape and is arranged in a region around the second ground member, and the conductive member is electrically connected to the first ground member and the second ground member.

* * * * *